Dec. 18, 1962  W. H. MARSHALL, JR  3,068,659
HEATING COLD FLUIDS WITH PRODUCTION OF ENERGY
Filed Aug. 25, 1960  2 Sheets-Sheet 1

INVENTOR.
Walton H. Marshall, Jr.
BY
Ooms, McDougall, Williams & Hersh
Attorneys

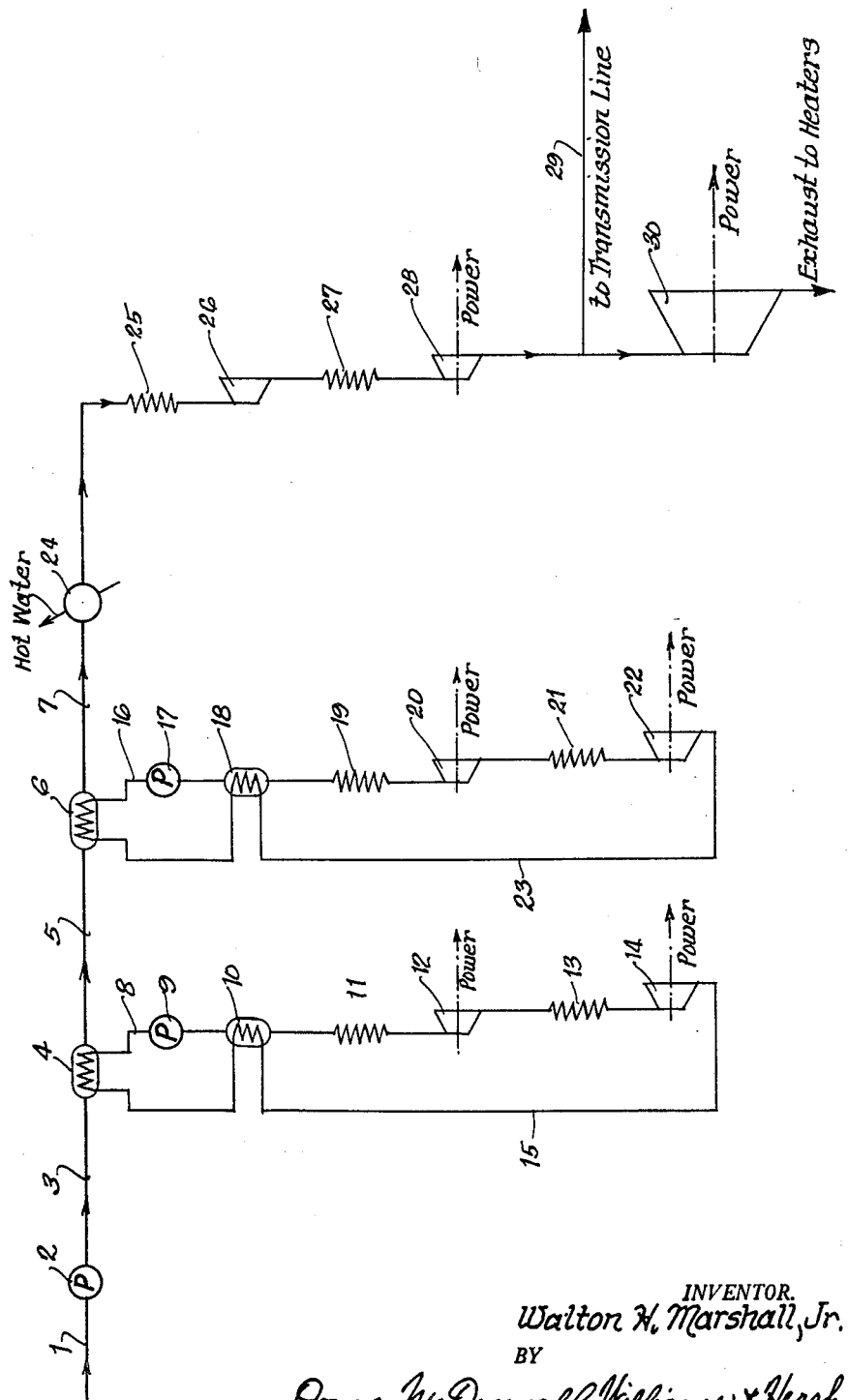

United States Patent Office 3,068,659
Patented Dec. 18, 1962

3,068,659
HEATING COLD FLUIDS WITH PRODUCTION OF ENERGY
Walton H. Marshall, Jr., Downings, Va., assignor to Conch International Methane Limited, Nassau, Bahamas, a corporation of the Bahamas
Filed Aug. 25, 1960, Ser. No. 51,932
9 Claims. (Cl. 62—52)

This invention relates to a method of heating cold fluids, particularly liquefied low boiling gases such as nitrogen, methane, and ethane, with the simultaneous production of energy.

There is a growing use of low temperatures in the storage and transportation of gases and generally, when low temperature storage or transport is employed, the gas has to be heated to ambient temperatures or above before it can be put to its final use; thus natural gas (methane), ethane and propane may now be stored and transported as boiling liquids which are regasified and heated at the point of use.

In this regasifying and heating, the energy used in liquefying the gas is lost.

It has already been proposed, for example in the United States Patent No. 2,937,504, to recover a major part of this energy by carrying out the vaporization or heating of the liquefied substances in conjunction with a cyclic process in which a working medium is cooled and then heated again.

It is the object of this invention to improve such a cyclic process in order to recover a larger part of the energy.

These and other objects and advantages of this invention will hereinafter appear and for purposes of illustration, but not of limitation, embodiments of this invention are shown in the accompanying drawings, in which:

FIGURE 2 is a flow diagram illustrating the practice of this invention as applied to the production of natural gas at pipeline pressure from liquefied natural gas.

Figure 1:
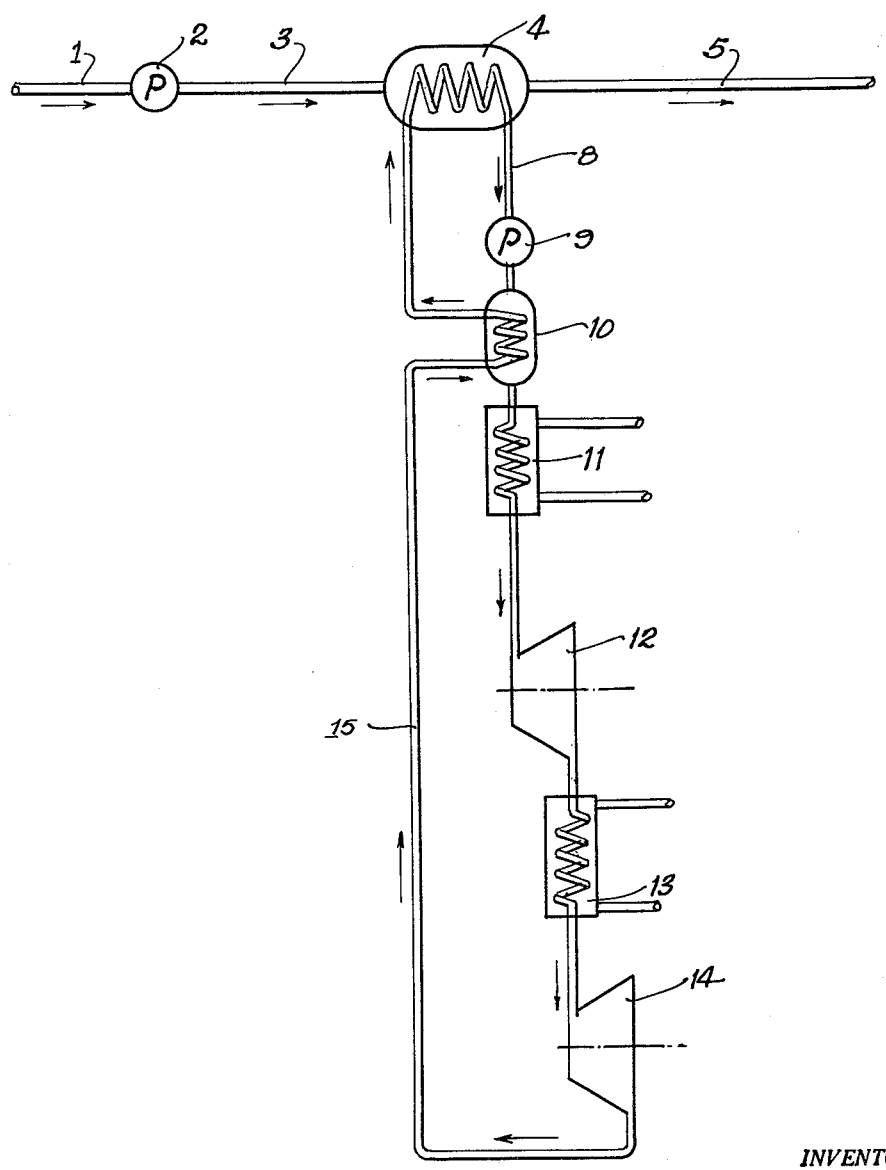
FIGURE 1 is a flow diagram of the practice of this invention.

Accordingly, this invention provides a method of heating a cold fluid with simultaneous production of energy which comprises passing it through a condenser in which it is heated by indirect heat exchange with a thermodynamic fluid having a higher boiling point than the fluid to be heated and in which the thermodynamic fluid is liquefied, pressurizing the liquefied working gas, heating the pressurized working gas by indirect heat exchange with expanded working gas produced in the engine hereinafter mentioned, vaporizing under pressure the heated pressurized liquefied working gas, expanding the vaporized working gas in an engine to produce energy, passing the expanded working gas in indirect heat exchange with the pressurized liquefied working gas, and then recycling it to the condenser.

The expansion of the vaporized working gas may be carried out in a pluralty of stages, the gas being heated between each stage.

The cold fluid to be heated may be passed through a plurality of condensers in each of which it is heated by indirect heat exchange with a working gas having a higher boiling point than that in the previous condenser, and the resulting liquefied working gas is then subjected to the same cyclic process as described above.

If the cold fluid to be heated is passed through the condenser or condensers under pressure, it may itself be finally expanded in an engine to produce additional energy.

While this invention is primarily concerned with regasifying and heating liquefied low boiling gases, such as nitrogen, methane, or ethane, it can also be applied to heating the same materials in cold gaseous form.

The heat required to vaporize the liquefied working gases may be any convenient low cost source of heat, for example, the ambient air, river or sea water, or waste hot water or steam.

The invention is particularly applicable to the regasification and heating of liquefied natural gas and will now be described in detail in this connection with reference to the accompanying drawings.

Referring to FIGURE 1, liquefied natural gas at atmospheric pressure is fed by pipe 1 into pump 2 in which it is pumped up to 3000 p.s.i.a. It then passes at 3000 p.s.i.a. and about —250° F. through line 3 and heat exchanger 4, which it leaves by line 5 at a temperature of —100° F.

The heating of the liquefied natural gas in condenser 4 is achieved by heat exchange with condensing ethane. The liquefied ethane leaves heat exchanger 4 via pipe 8 and is pumped up to 2000 p.s.i.a. in pump 9. The pressurized liquid ethane then passes through heat exchanger 10 in which it is heated by indirect heat exchange with expanded ethane flowing through line 15. The liquid ethane leaving heat exchanger 10 is further heated to 330° F. by some source of waste heat in heater 11, and then expanded in expansion engine 12 with the production of energy. The ethane leaves expansion engine 12 at 280 p.s.i.a. and is then reheated to 330° F. in heater 13. It is then expanded in expansion engine 14 with the production of energy, its pressure being reduced to 40 p.s.i.a. and its temperature to 150° F. The expanded ethane then flows through pipe 15 via heat exchanger 10, in which it is cooled to —75° F., and recycled to heat exchanger 4, in which it is condensed and cooled to —90° F. to complete the cycle.

Referring to FIGURE 2, which illustrates the complete operation of heating liquefied natural gas up to ambient temperature for transmission to a gas pipeline, the numerals 1–5 and 8–15 have the same significance as in FIGURE 1, and the heating of the natural gas to —100° F. in pipe 5 is carried out as described in connection wth FIGURE 1. The natural gas at 3000 p.s.i.a. and —100° F. then passes through condenser 6 in which it is heated to 0° F. by indirect heat exchange with condensing propane, and passes out of condenser 6 through pipe 7.

The condensed propane leaving condenser 6 at 10° F. in line 16 is pumped up to 1000 p.s.i.a. in pump 17, and then passes through heat exchanger 18 in which it is heated by indirect heat exchange with expanded propane passing through pipe 23. The liquid propane leaving heat exchanger 18 is further heated to 230° F. in heater 19 and then expanded in expansion engine 20 with the production of energy. The propane leaves expansion engine 20 at 100° F. and 210 p.s.i.a. and is reheated in heater 21 to 230° F. It is then expanded in expansion engine 22 with the production of energy. The propane vapor leaves expansion engine 22 at 45 p.s.i.a. and 100° F. and passes via pipe 23 through heat exchanger 80 in which it is cooled to 25° F. It then passes through condenser 6 in which it is liquefied and cooled to 10° F. to complete the cycle.

The natural gas at 0° F. and 3000 p.s.i.a. in pipe 7 is heated to 40° F. by water in heater 24. It is then further heated, for example by waste hot water, in heater 25, and then expanded down to 700 p.s.i.a. in expansion engine 26. The natural gas is then reheated in heater 27 and further expanded down to 150 p.s.i.a. in expansion engine 28. Both expansion engines 26 and 28 provide additional sources of energy. The natural gas at 150 p.s.i.a. may then be fed to a suitable transmission line via pipe 29 and, if desired, some of it may be fed to a gas turbine 30 in which it is burnt to produce power or heat by conventional methods.

If, in the above process described in FIGURE 2, the feed of liquefied methane is 80 million cubic feet a day, the power generated in the ethane and propane cycles would be 12,000 kw. and the power generated from the natural gas itself in expansion engines 26 and 28 would be 15,000 kw. If 8% of the natural gas was then burnt in gas turbine 30, it could produce a further 27,000 kw. and the exhaust heat from this gas turbine would be sufficient to supply the heat for heaters 11, 13, 19, 21, 25 and 27.

In the practice of this invention, it is preferred to pressurize the liquefied working gas to a pressure above its critical pressure whereby it will remain in a fluid state in the cycle until expanded to a pressure below its critical pressure while at a temperature below its boiling point under the pressure condition existing, such for example, as a result of the expansion in engines 12 or 20.

While in the foregoing description particular reference has been made to ethane and propane as the working gases, other alkanes having less than 5 carbon atoms, such as methane and propane, may be used. Also, alkenes having 2–4 carbon atoms my be used, and also halogenated derivatives of these alkanes and alkenes such as dichloroethylene and dichlorodifluoromethane may be used.

I claim:

1. A method of heating a cold fluid with simultaneous production of energy which comprises passing it through a condenser in which it is heated by indirect heat exchange with a working gas having a higher boiling point than the fluid to be heated and in which the working gas is liquefied, pressurizing the liquefied working gas, heating the pressurized working gas by indirect heat exchange with expanded working gas produced in the engine hereinafter mentioned, vaporizing under pressure the heated pressurized liquefied working gas, expanding the vaporized working gas in an engine to produce energy, passing the expanded working gas in indirect heat exchange with the pressurized liquefied working gas, and then recycling it to the condenser.

2. A modification of the method claimed in claim 1 in which the expansion of the vaporized working gas is carried out in a plurality of stages, the gas being heated between each stage.

3. A method as claimed in claim 1 in which the cold fluid to be heated after passing through the condenser is passed through at least one further condenser in which it is heated by indirect heat exchange with a working gas having a higher boiling point than the working gas in the previous condenser and the resulting liquefied working gas is subjected to the same cyclic process as the working gas in claim 1.

4. A method as claimed in claim 3 in which the cold fluid to be heated is passed through the condensers under pressure.

5. A method as claimed in claim 4 in which the cold fluid which has been heated under pressure is, after further heating if required, itself expanded in an engine to produce energy.

6. A method as claimed in claim 3 in which the cold fluid to be heated is a liquefied low boiling gas which is vaporized in its passage through the condensers.

7. A method as claimed in claim 6 in which the cold fluid is liquefied natural gas and the working gases are selected from the group consisting of alkanes having less than 5 carbon atoms, alkenes having 2–4 carbon atoms, and halogenated derivatives thereof.

8. A method as claimed in claim 1 which includes the step of pressurizing the cold fluid to a pressure above its critical pressure before passage through the condenser in indirect heat exchange relation with the working gas.

9. A method as claimed in claim 1 in which the liquefied working gas is pressurized to a pressure above its critical pressure.

References Cited in the file of this patent

UNITED STATES PATENTS

| | | |
|---|---|---|
| 2,937,504 | Riediger | May 24, 1960 |
| 2,940,268 | Morrison | June 14, 1960 |
| 2,956,419 | Boling | Oct. 18, 1960 |
| 3,018,634 | Gilmore | Jan. 30, 1962 |